United States Patent
Bailly

(10) Patent No.: US 6,394,145 B1
(45) Date of Patent: May 28, 2002

(54) FLEXIBLE CONDUIT, SUCH AS PIPE FOR MEDICAL OR SURGICAL USE

(75) Inventor: Pierre Bailly, Lyons (FR)

(73) Assignee: Norton Gessil (FR)

( * ) Notice: Subject to any disclaimer, the term of this patent is extended or adjusted under 35 U.S.C. 154(b) by 0 days.

(21) Appl. No.: 09/463,379

(22) PCT Filed: Jul. 22, 1998

(86) PCT No.: PCT/FR98/01623

§ 371 (c)(1),
(2), (4) Date: May 16, 2000

(87) PCT Pub. No.: WO99/05441

PCT Pub. Date: Feb. 4, 1999

(30) Foreign Application Priority Data

Jul. 24, 1997 (FR) .............................................. 97 09668

(51) Int. Cl.⁷ ................................................ F16L 11/11
(52) U.S. Cl. ........................ 138/129; 138/122; 138/154; 156/428; 156/195
(58) Field of Search ................................ 138/129, 132, 138/122, 154; 156/143, 144, 428–431, 195

(56) References Cited

U.S. PATENT DOCUMENTS

| 3,252,483 | A | * | 5/1966 | Swan | 138/122 |
| 3,442,297 | A | * | 5/1969 | Wesesku | 138/122 |
| 4,119,123 | A | * | 10/1978 | Samuels | 138/122 |
| 4,203,476 | A | * | 5/1980 | Vitellaro | 138/122 |
| 4,343,672 | A | * | 8/1982 | Kanao | 156/428 |
| 4,350,547 | A | * | 9/1982 | Kanao | 138/122 X |
| 4,613,389 | A | * | 9/1986 | Tanaka | 138/122 X |
| 5,015,958 | A | * | 5/1991 | Masia et al. | 324/522 |

* cited by examiner

*Primary Examiner*—Patrick Brinson
(74) *Attorney, Agent, or Firm*—Cantor Colburn LLP

(57) ABSTRACT

Disclosed is a process for obtaining a flexible conduit comprising a tube and a helical structure. The process comprises extruding a crosslinkable plastic material in a malleable or formable state, so as to form a profiled strip having, as one piece, a web with two mutually complementary marginal edges, and at least one rib projecting on one side from the web; winding the profiled strip about an axis in a helix with touching turns so that the complementary marginal edges of the profiled strip, belonging respectively to two different turns, form between them, directly, a sealed joint; varying and controlling a winding pitch of the profiled strip, in order to modulate and control a quantity of available and formable plastic material of the tube along the length of the conduit; and crosslinking the wound profiled strip.

14 Claims, 2 Drawing Sheets

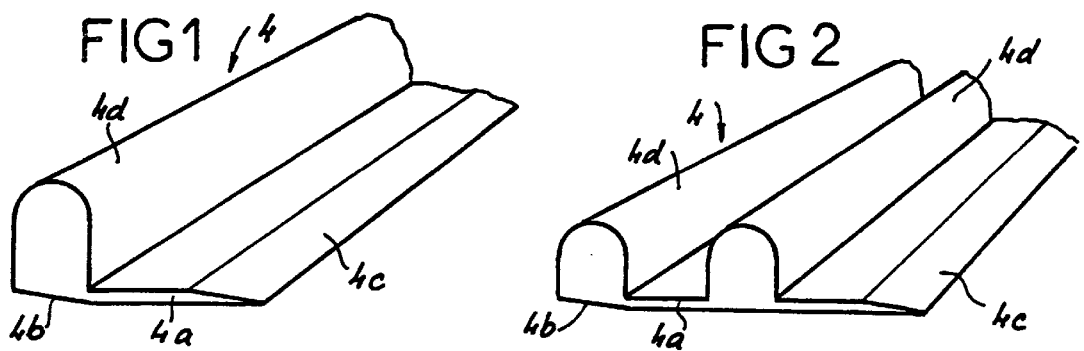
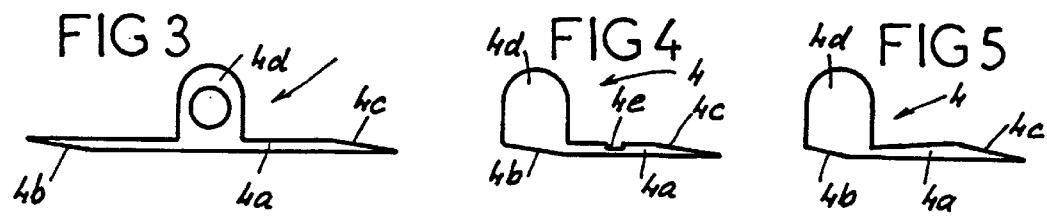
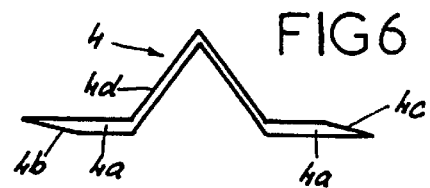
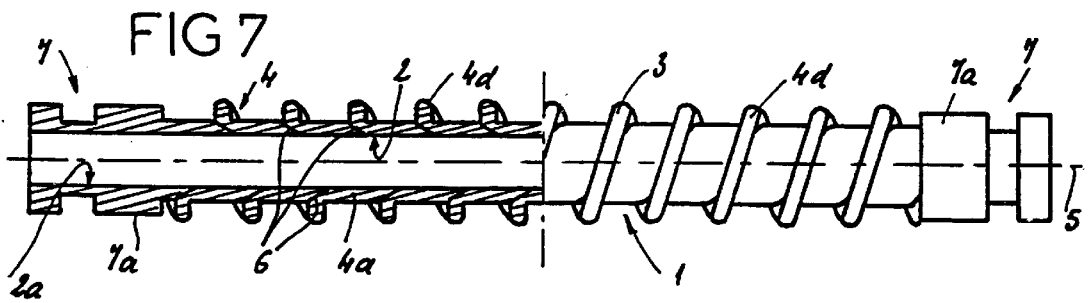

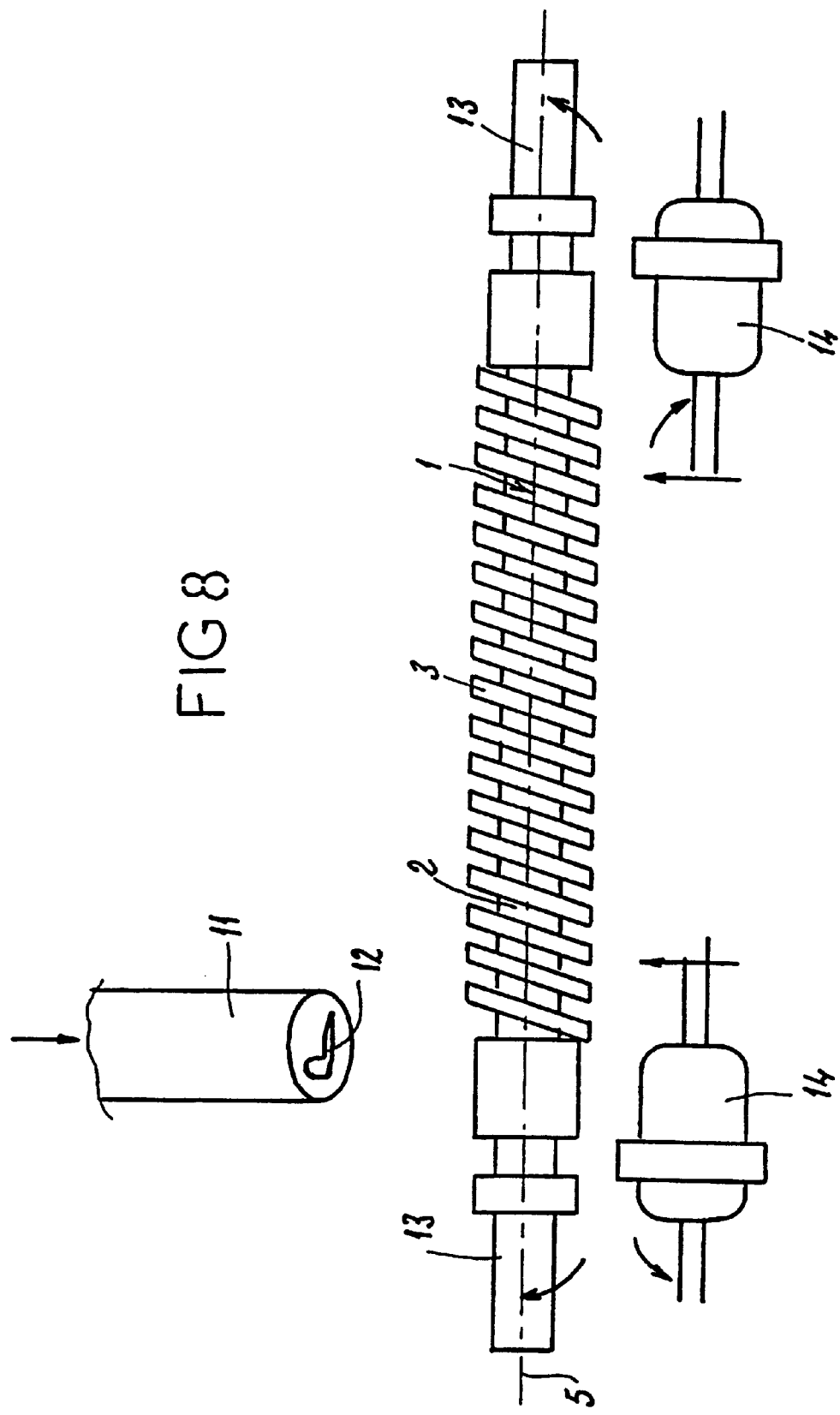

FLEXIBLE CONDUIT, SUCH AS PIPE FOR MEDICAL OR SURGICAL USE

The present invention relates to a flexible conduit, such as one used or made for obtaining a sterilizable hose for medical or surgical use, for example for conveying a gas to a patient, it being understood that such a conduit may have many other applications.

In accordance with document U.S. Pat. No. 4,343,672, a process is described for obtaining a flexible conduit, said conduit comprising a profiled strip, having, as one piece, a web with two mutually complementary marginal edges and at least one rib projecting on one side from the web, according to which process the profiled strip is obtained by extruding a crosslinkable plastic, the profiled strip, after it has been obtained by extrusion, is wound about an axis in a helix with touching turns, so that the complementary marginal edges of the profiled strip, belonging respectively to two different turns, form between them, directly, a sealed joint, and the wound profiled strip, with directly touching turns, is crosslinked in order to obtain a one-piece flexible conduit.

In practice, and in particular with regard to a hose for medical or surgical use, a flexible conduit of the type defined above must be joined, at least at one end, to an end-piece, which in general is handled, and in particular is repeatedly fitted onto and removed from a complementary fixed part. This end-piece is generally a piece which is sealably attached and fitted onto the said end of the conduit.

Such an end-piece is the cause of many drawbacks.

That region of the flexible conduit which is adjacent to the end-piece is subjected to repeated bending because of the manipulation of the hose or of the end-piece and necessarily constitutes a region of weakness. This is particularly true in the case of a hose for medical or surgical use, which is continually being connected to and disconnected from a fixed part, or fitting, of another hose or of an apparatus, for example a respirator. Furthermore, and in this application, the repeated sterilization of the hose also helps to weaken the region adjacent to the end-piece. In this medical and surgical use, a weak region of this kind is unacceptable since it contravenes the safety requirements of the medical hose, in terms of sealing with respect to the inside or the outside of the conduit.

This end-piece also complicates the manufacture of the final hose, by requiring the manufacture of an independent piece, this piece then having to be sealably fitted onto the flexible conduit. In certain cases, the difference in inside diameter between the flexible conduit itself and the end-piece additionally requires the end-piece to be adapted to this variation in inside diameter or requires an additional adapting piece to be provided and fitted onto the flexible conduit.

The object of the present invention is to remedy these drawbacks.

More particularly, the subject of the invention is a process for obtaining a flexible conduit of the type defined above, making it possible to obtain, in a monolithic manner, a single piece incorporating not only an impermeable internal tube and a helical external structure supporting the internal tube, but also the end-piece or end-pieces required for the use of the flexible conduit.

For this purpose, the invention provides a process for obtaining a flexible conduit comprising a profiled strip having, as one piece, a web with two mutually complementary marginal edges, and at least one rib projecting on one side from the web, the process comprising:

(a) winding the profiled strip, after it has been obtained by extrusion, about an axis in a helix with touching turns so that the complementary marginal edges of the profiled strip, belonging respectively to two different turns, form between them, directly, a sealed joint; and (b) crosslinking the wound profiled strip, with directly touching turns, to obtain a one-piece flexible conduit, wherein during the winding of the profiled strip, the winding pitch of the profiled strip is varied in order to control or modulate the supply of deformable plastic manner along the length of the conduit.

The expression "directly touching turns" should be understood to mean the formation of a sealed joint at each marginal edge of the profiled strip, this joint connecting, in a sealed manner, without the interposition of an adhesive, the each marginal edge to the adjacent marginal edge of an adjacent turn. This joint is obtained directly by bonding between the two adjacent marginal edges, along the entire appropriate grouting outline, for example with straight, obliquely chamfered or "stepped" edges.

Next, by virtue of the above defined process, it is possible, during step (a), to vary the winding pitch of the profiled strip along the length of the conduit, thereby making it possible to control or modulate along the length of the conduit the supply of malleable or deformable plastic and the amount of material available per unit length.

Preferably, the winding pitch is decreased during step (a), for example at one end of the conduit, in order to locally increase the thickness of plastic available in the malleable or formable state, before crosslinking.

If the thickness of deformable plastic is increased in this way during step (a) at one or both ends of the conduit, it is thus possible, while the plastic is still malleable, to form an end-piece in this thickness. This plastic is then crosslinked in order to obtain a flexible conduit in which the end-piece or the two end-pieces are made as one piece with the impermeable internal tube and the external surface of the flexible conduit interrupts or extends the helical external structure.

Preferably, according to step (a), the profiled strip is wound, as it leaves the extrusion die, around a bar which is moved in translation and in rotation, the external cross section of which sets or predetermines, in negative, the internal cross section of the flexible conduit, while the plastic is still deformable or malleable.

This operating choice is particularly advantageous in that it allows the internal cross section to be varied or modified, along the length of the latter, for example in order to change the internal diameter of the conduit from a nominal value to another value, which is lower or higher, determined by an end-piece or fitting, without any other complementary piece or component, such as an adapter.

The present invention will now be described with reference to the appended drawing, in which:

FIG. 1 shows a perspective view of a profiled strip as employed according to the invention;

FIG. 2 shows an alternative embodiment of a profiled strip, as employed according to the invention, again in perspective;

FIGS. 3 to 6 show, in cross section, four different embodiments of a profiled strip as employed according to the invention, respectively;

FIG. 7 shows, on the left-hand side, a sectional view and, on the right-hand side, a front view of a complete flexible conduit capable of being obtained according to the invention;

FIG. 8 shows schematically an apparatus or rig allowing a flexible conduit to be obtained in accordance with the present invention.

A flexible conduit 1 (cf. FIG. 7) is obtained according to the invention from a profiled strip 4, which is itself obtained by extrusion, especially of a plastic, for example a silicone in the uncrosslinked state.

In general, this profiled strip 4 comprises, according to a one-piece construction or structure, a web 4a, having two mutually complementary marginal edges 4b and 4c, and at least one rib 4d projection on one side from the web 4a.

Moreover, this profiled strip 4 has the following characteristics:

- the two marginal edges 4b and 4c of the web 4a of the profiled strip 4 are formed as two mutually complementary chamfers, respectively;
- the rib 4d has a rounded cross section at its top; this cross section may be rectangular or triangular, for example;
- the rib 4d has a solid cross section; this cross section may be hollow, as shown for example in FIG. 3; this cross section may in fact be in the form of a bellows, as shown in FIG. 6;
- the rib 4d is located on the same side as one marginal edge of the profiled strip 4, for example on the same side as the marginal edge 4b.

In order to obtain and employ this profiled strip 4, a manufacturing rig shown schematically in FIG. 8 is used, this rig comprising:

- an extrusion head 11 for extruding plastic (uncrosslinked silicone), the die 12 of which determines the profile of the strip 4 as defined above;
- a bar 13 which can be moved in translation and rotation with respect to the extrusion head 11;
- two tools 14 with rollers, these being able to be moved closer to the bar 13, parallel to the latter, and moved in rotation, in order to form, in the malleable plastic of the conduit, end-pieces of axisymmetric shape.

Immediately on leaving the extrusion head 11, the profiled strip, having the characteristics described above, is wound around an axis 5, corresponding to the bar 13 which is moved in translation and rotation, in a helix with directly touching turns so that the complementary marginal edges 4b and 4c of the profiled strip, belonging respectively to two different turns, form between them, and directly, a sealed joint 6. In this way, the winding, with directly touching turns, in a sealed manner, of the web 4a of the profiled strip 4 generates an internal tube 2. Correspondingly, the helical winding of the rib 4d of the profiled strip 4 generates a helical external structure 3 which supports the impermeable internal tube 2.

In a manner not shown in FIG. 8, the winding pitch of the profiled strip, at the two ends of the bar 13, is decreased with respect to the pitch in the remaining part of the conduit being produced. This makes it possible to have at the two ends an additional amount or overthickness of plastic, in the malleable or formable state.

When the plastic of the strip is still formable or malleable, that is to say before the elastomer material is crosslinked, the material of the profiled strip 4, wound as a helix, is formed at the two ends of the conduit 1 by the rotational action of the two tools 14 with a roller, into two end-pieces 7 respectively, these being axisymmetric and integral with the internal tube 2, the external surface 7a of which interrupts or extends the helical external structure 3 (cf. FIG. 7) and the internal surface of which forms a continuous surface with that of the tube 2.

A flexible conduit, generally having the structure shown in FIG. 7, is thus obtained solely from the extruded profiled strip 4 which, in particular, supplies the material needed to form the internal tube 2 and the helical external structure 3, but also the end-pieces 7, by having reduced the winding pitch at the point where they are located.

Next, this conduit 1 is set in its final form, shown in FIG. 7, by crosslinking the elastomer.

The present invention also includes the following alternative forms, which may be considered individually or in combination:

- according to FIG. 2, the profiled strip 4 has at least two parallel ribs 4d, thereby making it possible in particular to reduce the time required for the helical winding operation, using step (a) described above;
- according to FIG. 5, the part 4a of the profiled strip 4 has a thickness which varies over the width of the profiled strip, away from the rib, so as in particular to define a relatively thin helical region, favoring and predetermining the curvature of the flexible product 1;
- the web 4a of the profiled strip 4 has a notch 4e parallel to the rib 4d, as shown in FIG. 4; this helical notch in the finished conduit favors and predetermines the curvature of the flexible conduit 1, makes it flexible and allows a concertina-type conformation, in particular for storage;
- the rib 4d may be located in the middle or center of the web 4a, as shown in FIG. 3;
- the cross section of the rib 4d may be hollow, as shown in FIG. 3, and triangular or with sharp corners, instead of being rounded; this cross section may in particular have the shape of a bellows, or of one element of a bellows, as shown in FIG. 6.

It follows from the process described above that the thickness is different from, namely greater than, that of the internal tube 2 at the end-pieces 7, thereby strengthening the conduit 2 at its end. This increased strength makes it possible to connect and disconnect the conduit to and from any other piece or fitting, for example onto the connector of an assisted respiration machine, without in any way weakening or impairing the flexible conduit.

The internal cross section of each end-piece 7 is not necessarily axisymmetric; this internal cross section may in particular have a polygonal shape.

The internal cross section of the internal tube 2 and of the end-pieces 7 may vary along the length of the conduit; in particular, it may be slightly frustoconical. Most particularly, at the end-pieces 7, it may be greater or smaller than the nominal internal cross section of the tube, in order to be able to connect the said end-pieces to any fitting or component of cross section different from the nominal internal cross section, this being so without any other complementary or added arrangement.

The inside surface 2a of the internal tube 2 may be corrugated or striated, or completely smooth, from one end to the other, including forming a continuous surface with the internal surface of the end-pieces.

The internal surface of the conduit 1 may be continuous along its entire length, including the end-pieces 7, in particular without any discontinuity, for example in "stepped" form, between the conduit proper and the end-piece or end-pieces.

The web 4a and/or the rib 4d may include a reinforcement, for example a woven or non-woven structure, or an insert, which reinforces or imparts other properties or characteristics to the finished flexible conduit.

What is claimed is:

1. A process for obtaining a flexible conduit comprising a tube and a helical structure, the process comprising:

extruding a crosslinkable plastic material in a malleable or formable state, so as to form a profiled strip having, as one piece, a web with two mutually complementary marginal edges, and at least one rib projecting on one side from the web;

winding the profiled strip about an axis in a helix with touching turns so that the complementary marginal edges of the profiled strip, belonging respectively to two different turns, form between them, directly, a sealed joint;

varying and controlling a winding pitch of the profiled strip, in order to modulate and control a quantity of available and formable plastic material of the tube along the length of the conduit; and crosslinking the wound profiled strip.

2. The process according to claim 1, wherein the thickness of the plastic material of the flexible conduit is increased by decreasing the winding pitch.

3. The process according to claim 2, further comprising decreasing the winding pitch at least one end of the tube during the step of winding and forming an end-piece in a thickness of formable plastic material at the at least one end of the tube.

4. The process according to claim 1, wherein during the extrusion and winding, the profiled strip, on leaving an extrusion die, is wound around a bar which is moved in translation and in rotation, and the external cross section of said bar sets the internal cross section of the flexible conduit.

5. The process according to claim 3, wherein the end-piece is formed in the thickness of formable plastic with a roller which determines the external axisymmetric shape of the end-piece.

6. The process according to claim 3, wherein the end-piece is formed by stamping or die forming.

7. The process according to claim 4, wherein at least one end of the bar, an end-piece is added, which sets, at the corresponding end of the flexible conduit, an internal shape different from that of the rest of said conduit.

8. A conduit comprising:

a profiled strip having, as one piece, a web with two mutually complementary marginal edges, and at least one rib projecting from one side from the web, such that the profiled strip is wound about an axis in a helix with touching turns to form a sealed joint between two adjacent marginal edges, and to have various winding pitches along the length of the conduit.

9. The process according to claim 1, wherein the profiled strip has at least two parallel ribs.

10. The process according to claim 1, wherein the web of the profiled strip has a thickness which varies over the width of the profiled strip, away from the rib.

11. The process according to claim 1, wherein the web of the profiled strip has a notch parallel to the rib.

12. The process according to claim 3, wherein the internal cross section of the end-piece is not axisymmetric.

13. The process according to claim 1, wherein the internal cross section varies along the length of said conduit.

14. A sterilizable hose for surgical or medical use, comprising:

a conduit including a profiled strip having, as one piece, a web with two mutually complementary marginal edges, and at least one rib projecting from one side from the web, such that the profiled strip is wound about an axis in a helix with touching turns to form a sealed joint between two adjacent marginal edges, and to have various winding pitches along the length of the conduit.

* * * * *